UNITED STATES PATENT OFFICE.

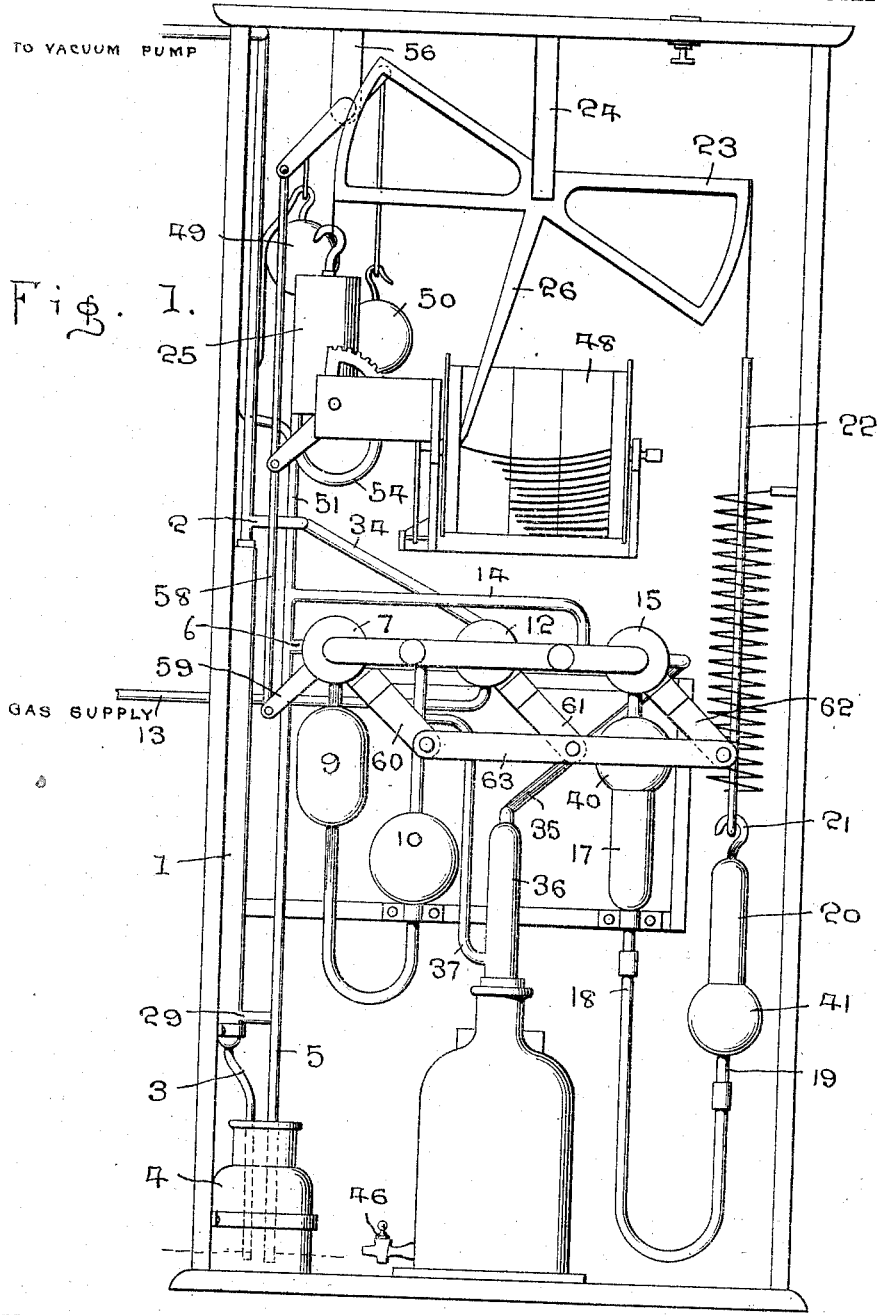

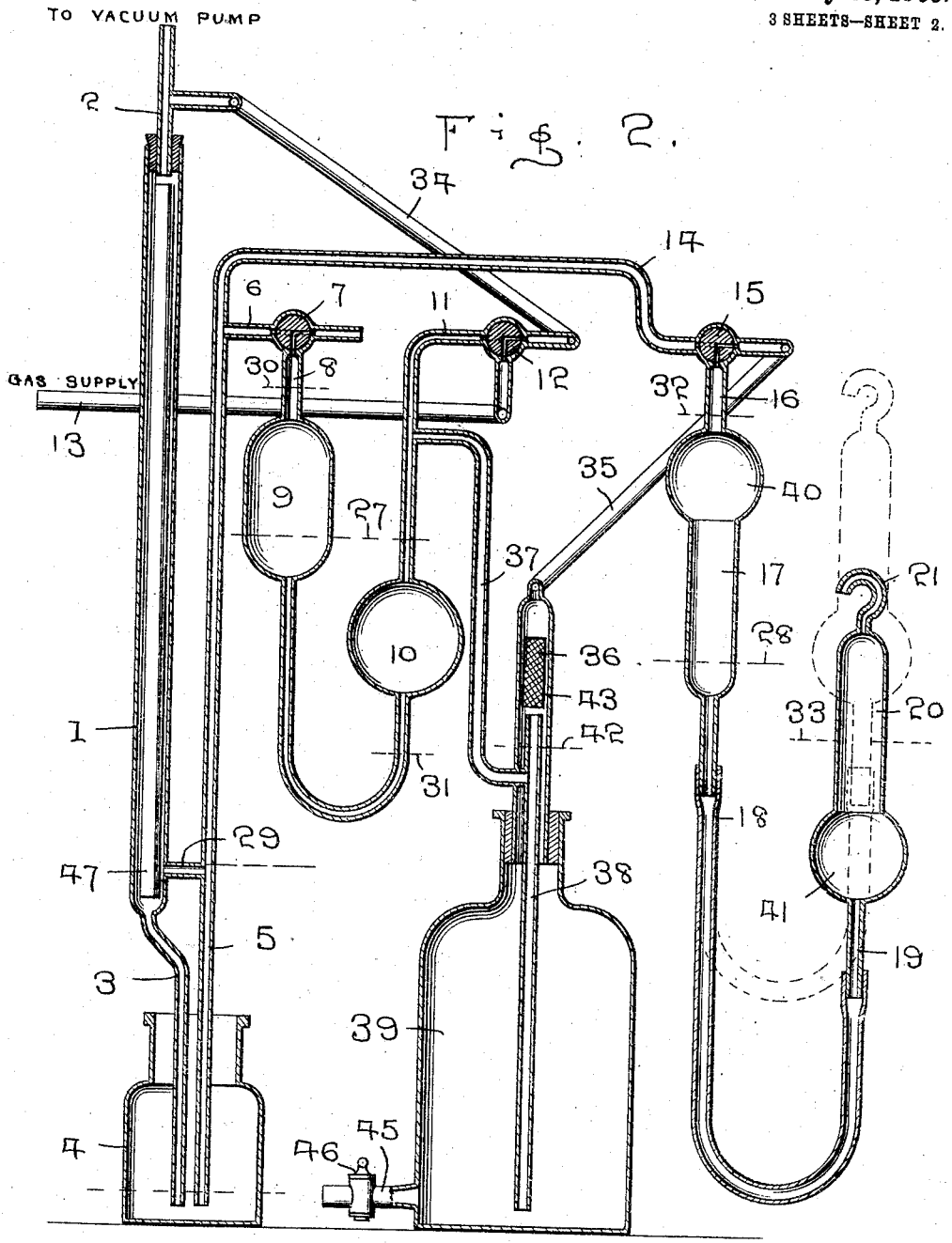

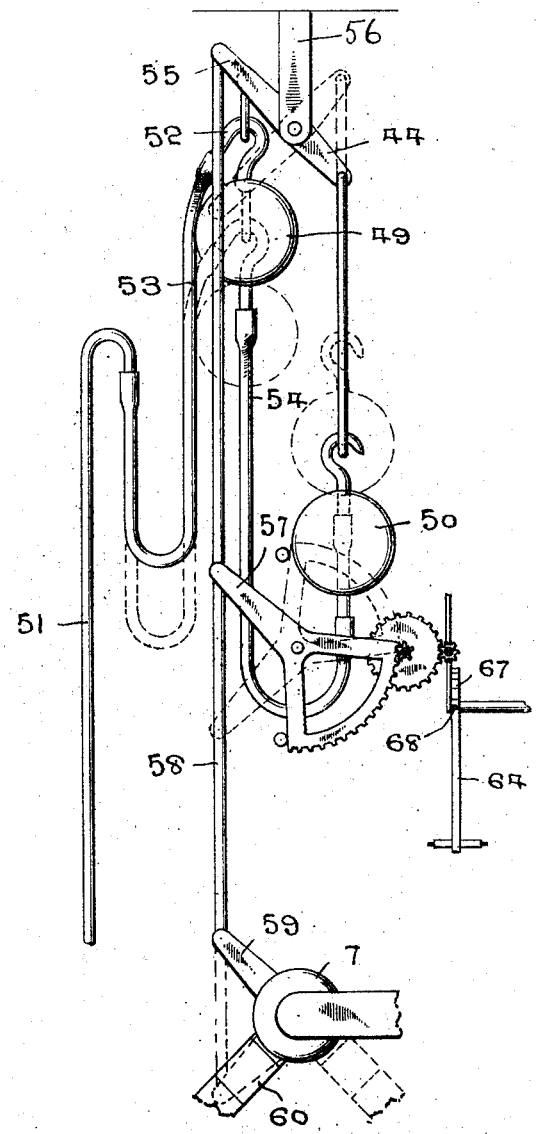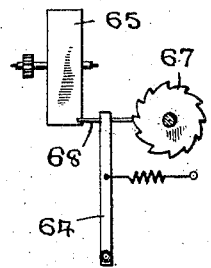

GUNNAR VICTOR CEDERBORG, OF DENVER, COLORADO.

GAS-ANALYZING APPARATUS.

No. 928,027.   Specification of Letters Patent.   Patented July 13, 1909.

Application filed October 6, 1908. Serial No. 456,376.

*To all whom it may concern:*

Be it known that I, GUNNAR V. CEDERBORG, a subject of the King of Sweden, residing at Denver, in the county of Denver and State of Colorado, have invented certain new and useful Improvements in Gas-Analyzing Apparatus; and I do hereby declare the following to be a full, clear, and exact description of the invention, such as will enable others skilled in the art to which it appertains to make and use the same.

My invention relates to new and useful improvements in gas analyzing apparatus and my object is to provide a weighing device to determine the volume of gas.

A further object is to provide means for directing the gas through an absorbing liquid.

A still further object is to provide means for creating a vacuum in the analyzing apparatus previous to the weighing process, and a still further object is to provide means for automatically operating the controlling parts of the apparatus.

Other objects and advantages will be hereinafter referred to and more particularly pointed out in the claims.

In the accompanying drawings which are made a part of this application, Figure 1 is an elevation of my improved analyzing apparatus, showing the same operatively attached to an automatic weighing and recording device. Fig. 2 is a vertical sectional view through the analyzing device. Fig. 3 is an elevation of the device for automatically operating the controlling parts of the apparatus, and, Fig. 4 is a side elevation of that part of the device shown in Fig. 3, which serves to time the action of same.

Referring to the drawings in which similar reference numerals designate corresponding parts throughout the several views, 1 indicates a regulator, which is preferably tubular in cross section and is connected at its upper end through the medium of the joint 2, to any suitable form of ejector (not shown) by which means a vacuum may be caused in the regulator.

The lower end of the regulator 1 is reduced in size to form a terminal 3, which terminal is introduced into a receptacle 4, which receptacle is adapted to contain a predetermined quantity of sealing liquid, such as mercury, or the like, and when a vacuum is created in the regulator 1, a portion of the mercury will be drawn through the terminal into the regulator. Also entering the receptacle 4 and terminating co-incident to the lower end of the terminal 3, is a pipe 5, which pipe extends upwardly parallel with the regulator 1 to a point adjacent its upper end and extends thence in a horizontal position a predetermined distance, the vertical portion of the pipe 5 being provided adjacent its upper end with a section 6, in the length of which is placed a three-way cock 7.

Depending from the section 6 is a tube 8, which tube is substantially U-shaped and is provided with chambers 9 and 10, the chamber 9 being in a plane above the chamber 10 and on the vertical portion of the tube connected to the section 6, while the chamber 10 is on the opposite vertical portion of the tube. The upper end of the portion of the tube 8 carrying the chamber 10 is bent downwardly to a horizontal position and in alinement with the section 6, the section 11 thus formed, likewise having a three-way cock 12 intersecting the same, through which gas may be introduced into the tube 8 through a feed pipe 13, said pipe 13 extending to any receptacle or conduit containing the gas that is to be analyzed. The horizontal portion 14 of the pipe 5 is likewise intersected by a three-way cock 15 depending from which is a tube 16, said tube having in its length a chamber 17, while to the lower end of the tube 16 is secured a flexible connection 18, the opposite end of said connection being secured to a tube 19 depending from a weighing chamber 20, the upper end of the weighing chamber terminating in a tubular hook 21, by which means the chamber 20 is secured to a rod 22 depending from one end of a weighing beam 23.

The beam 23 is pivotally mounted in a hanger 24 and extends an equal distance to each side of the hanger, the rod 22 being secured to one end of the beam, while to the opposite end thereof is secured a weight 25, the central portion of the beam being provided with an indicating finger 26, at the point of which is secured a pen adapted to travel over a suitably graduated chart 48 moved by clockwork.

The chambers 9 and 10 and the connecting tube 8 are supplied with a predetermined quantity of mercury or other suitable fluid, as is also the chambers 17 and 20 and the flexible connection 18 and just previous to causing a vacuum in the various chambers and parts attached thereto, the cocks are in the position shown by full lines in Fig. 2, the mercury in the chambers 9 and 10 and connecting tube is at the level indicated by the dotted line 27, while the mercury in the chambers 17 and 20 is at the level indicated by the dotted line 28, the weighing chamber 20 being in the position shown by the full lines in Fig. 2.

As soon as the cocks are rotated 90 degrees or to the position indicated by dotted lines in Fig. 2, the ejector, which is operated continuously, will form a vacuum in the regulator 1 thus drawing the mercury into the receptacle 4 through the terminal 3 into the regulator, while the air is drawn from the pipe 5 and parts connected thereto into the regulator through a connection 29, the mercury in the receptacle 4 being likewise drawn through the lower end of the pipe 5 until it reaches the connection 29, thereby sealing the lower end of the pipe and terminal 3 and permitting the air in the upper end of the pipe 5 to filter through the mercury in the connection 29 and regulator 1 and escape through the joint 2. This operation will draw the mercury in the chambers 9 and 10 to the levels indicated by dotted lines at 30 and 31, while the mercury in the chambers 17 and 20 will be drawn to the levels indicated by the dotted lines 32 and 33, the vertical distance between the levels 30 and 31 and 32 and 33, respectively, being equal to the height of the mercury column in the pipe 5. The mercury in the pipe 5 being unable to rise higher than the connection 29, the mercury in the tubes 8 and 16, respectively, will always stop at a constant level. The removal of the weight of mercury from the weighing chamber 20 will permit said chamber to move upwardly to the position shown by the dotted lines in Fig. 2, this result being accomplished by placing the weight 25 at one end of the beam 23, said weight being such as to compensate for the weight of the weighing chamber, the flexible connection secured thereto, that portion of the mercury remaining in the connection and a certain part of the mercury contained in the weighing chamber itself.

At the time of causing the vacuum in the various chambers, the feed pipe 13 is connected through the cock 12 with the chamber 10, so that a supply of gas will be drawn in to the chamber 10 and said chamber and the tube carrying the same filled with gas down to the level 31, when the cocks 7, 12 and 15 are automatically rotated substantially 90 degrees, which will result in connecting that end of the tube 8 carrying the chamber 9 with the outer atmosphere through the open end of the section 6, while the cock 12 will close communication between the section 11 and feed pipe 13 and establish connection between the feed pipe and a coupling 34 extending from the outer end of the section 11 to the joint 2 and in like manner the cock 15 will close communication between the horizontal portion 14 of the pipe 5 and the tube 16 and open communication through a pipe 35 extending from the horizontal portion 14 of the pipe 5 to an absorption chamber 36, the cocks again taking the position shown by full lines in Fig. 2.

By connecting the chamber 9 with the outer atmosphere, the action of the vacuum is overcome so that the mercury in the chambers 9 and 10 will again return to its normal position or to the level 27, thereby forcing the gas in the chamber 10 through the tube 37, the upper end of which connects with the tube 8 at a point between the chamber 10 and cock 12, the lower end of the tube 37 entering the absorption chamber 36 and communicating with a vertically disposed pipe 38, the upper end of the pipe 38 extending a distance above the lower end of the tube 37, while the lower end thereof extends into a tank 39 employed for holding any suitable form of absorbent liquid.

The gas after having decreased in volume by passing through the absorption chamber, enters the pipe 35, thence through the openings in the cock 15 into the chamber 17, said gas displacing the mercury in the chamber 17 and forcing so much of the mercury from the chamber 17 into the weighing chamber 20 as the decreased volume of the gas will displace, the air in the weighing chamber being forced through the tubular hook 21, thus permitting the mercury to readily enter the weighing chamber. As the chamber 20 is suspended from the weighing beam 23, the weight of the mercury in the weighing chamber will swing the beam 23 on its pivot, the pen on the end of the indicating finger 26 making a line on the chart 48 provided for recording the result of the analysis, and as the volume of the mercury forced into the weighing chamber 20 is equal to the quantity of the gas in the chamber 17, the final position of the pen will indicate the per cent. of the gas absorbed from the gas mixture.

The chart 48 is to be moved a distance endwise after each operation of the analyzing device and in order to accomplish this result, I provide a suitable clock mechanism (not shown) for moving the chart after each operation of the indicating finger. As it is generally not desired to use a chart graduated for 100%, but only for such per cent. as will take in all possible fluctuations of the absorbent gas, as in this instance 15%, the counterpoise or weight 25 is of such size as to hold the beam from rocking until a certain weight of mercury has entered the weighing chamber 20, and in this instance the weighing chamber will not descend until a volume of mercury equal to 85% of the volume of gas contained in the chamber 10 has passed into the chamber 17.

In order to avoid an excessive length of the chambers 17 and 20 said chambers are preferably provided with globular enlargements 40 and 41 respectively, said enlargements, in this instance, being of such size as to hold a little less than 85%, so that if the gas mixture contains anything between 0 and 15% of the absorbent gas, the final level of the mercury will be somewhere on the cylindrical parts of the chambers 17 and 20.

As it is necessary to measure the gas at a constant pressure, the weighing device is constructed so that it allows the weighing chamber to descend in such a manner that the surface of the mercury in the weighing chamber 20 is always in a certain relative position to the surface of the mercury in the chamber 17. If it is desirable to measure the gas at atmospheric pressure, the surface of the mercury in the chambers 17 and 20 should be at the same level when the weighing process is completed.

During the weighing process the ejector is connected through the pipe 34 and cock 12 with the feed pipe 13, inducing a strong current of gas through said feed pipe, which is thus always kept filled with gas fresh from the gas producing process which is being controlled. As soon as the weighing process has been completed, the cocks 7, 12 and 15 are again automatically rotated 90 degrees when a new supply of gas will be drawn into the chamber 10 and the process repeated as described.

The tank 39 is filled with the absorption fluid to a point above the lower end of the tube 37 or to the level shown by the dotted line 42, so that when the gas is forced through the tube 37, it will be carried below the surface of the absorption fluid and thence upwardly through the upper end of the pipe 38 into the absorption chamber 36, the passage of the gas through the upper end of the pipe 38 raising a portion of the fluid above the end of the pipe 38 and causing a suction at the lower end of the pipe, thereby forming a circulation through the tank, and in this manner the absorption process will be more thoroughly accomplished, than by depositing the gas on the surface of the absorbing fluid.

As the gas is discharged with some force into the absorption chamber 36, the liquid in the tank 39 is prevented from being carried into the chamber 17 by filling the space above the upper end of the pipe 38 with some porous substance 43 such as pumice stone or a roll of fine wire gauze, which will serve to check any flying particles of the liquid and at the same time distribute the same over a large surface thus facilitating a complete absorption.

The absorption fluid is readily introduced into or removed from the tank 39 by providing a port 45 adjacent the lower end of the tank 39, said port being normally closed in any suitable manner as by means of a cock 46, and in this manner when the fluid has been in use for a sufficient length of time, the cock may be opened and the tank emptied, and refilled with fresh fluid by any suitable means.

To retain the level of the mercury in the receptacle 4 substantially uniform by preventing an undue amount thereof from being drawn into the regulator 1, said regulator may be provided with a core 47, the diameter of which is slightly less than the space in the regulator, thereby forming a narrow passage between the core and wall of the regulator, in which event but a small amount of the mercury can pass between the core and regulator, thereby retaining the mercury in the receptacle 4 substantially at a uniform level in view of the small quantity of mercury entering the regulator.

The automatic turning of the cocks is accomplished by means of the two chambers 49 and 50 which contain a predetermined quantity of mercury. These chambers are suspended from either end of the beam 44 which is pivotally mounted on the hanger 56. Secured to the same shaft as the beam 44 is the lever 55, which through the rod 58 is connected with the levers 57 and 59. The movement of the lever 57 is by means of gears transmitted to the governor 65, which is stopped by the pin 68. This pin is placed on the lever 64 and travels over the cam 67, said cam being rotated at a certain speed by the clockwork. The lever 59 is secured to the plug of the cock 7, said cock being through the levers 60, 61 and 62 and the rod 63, connected with the cocks 12 and 15.

The chamber 49 is through the tubular hook 52, the flexible tube 53 and the pipe 51, connected with the pipe 5, and at the moment when the pipe 5 is connected with the chambers 9 and 17, creating a vacuum in said chambers, a vacuum is also created in the chamber 49, causing the mercury in the chamber 50 to be drawn through the flexible tube 54 into the chamber 49, until the vertical distance between the levels in the chambers 49 and 50 respectively is equal to the height of the mercury column in the pipe 5. The chambers 49 and 50 are now at the position shown by full lines in Fig. 3, but the weight of the mercury in the chamber 49 tends to move the beam 44 and thus the whole system of rods and levers to the position shown by dotted lines in same figure. This movement is however prevented by the pin 68, which is holding the governor 65, until the clock work has moved the cam 67, so that the pin 68 can fall into one of the depressions of the cam 67, thus relieving the governor, when the system of rods and levers will take the position shown by dotted lines in Fig. 3. This movement turns the cocks substantially 90°, and as previously described the pipe 34 is thus connected with the feed pipe 13, which causes the vacuum in the regulator 1 and pipes connected therewith to be overcome, and the mercury in the chamber 49 now runs by gravity back in to the chamber 50, which grows in this manner heavier than the chamber 49 thus tending to move the levers and rods back to the position shown by full lines in Fig. 3.

The movement of the mercury from one chamber to another requires a certain time, and during this time the cam 67 has rotated far enough to slightly raise the pin 68 so as to engage the governor 65 and hold the same until another depression of the cam is reached.

It will thus be seen that I have provided a very simple and accurate means for analyzing gases, and one that will be automatically operated to intermittently operate the various parts of the analyzing device. It will likewise be seen that by introducing the gas into the absorbent material at a point below the surface thereof, the absorption process will be very thorough and accurate and it will likewise be seen that by determining the analysis of the gases by the weighing process, a most accurate degree of perfection can be accomplished.

What I claim is:

1. In an analyzing device, the combination with a plurality of chambers, one of which is movable, pipes connecting said chambers in pairs, a supply pipe adapted to convey gases into one set of the chambers, automatically operated cocks adapted to control the movement of the gases through the chambers and means to form a vacuum in said chambers; of a tank between portions of said chambers adapted to contain an absorbing liquid, means to direct the gases through said liquid in its passage from one set of chambers to the opposite set and means connected to the movable chamber to register the volume of gas after the same has been passed through the absorbing liquid.

2. In an analyzing device, the combination of two pairs of liquid-containing chambers, one chamber of one set being movable, tubes connecting the sets of chambers, a supply pipe to convey gases into one set of said chambers, automatically-operated means for controlling the passage of the gases into said chambers, a tank between the sets of chambers adapted to contain an absorbing liquid, means to form a vacuum in said chambers and direct a supply of gas into one of the chambers, whereby when the vacuum is released, the liquid in the chambers will force the gas contained in one set of chambers through the absorbing liquid and into the opposite set of chambers.

3. In an analyzing device, the combination with two pairs of chambers, one chamber of one pair being movable, fixed tubes connecting one pair of chambers and a flexible tube connecting the opposite pair of chambers, said chambers and tubes containing a sealing liquid, a supply pipe adapted to convey gaseous products into one set of chambers, automatically-operated means for controlling the introduction of the gases into the chambers, means to create a vacuum in said chambers and introduce a supply of the gaseous products into one set of the chambers, a tank between the two sets of chambers, said tank containing an absorbing liquid, means to direct the gases from one set of the chambers through the absorbing liquid and into the opposite set of the chambers and means connected to the movable chamber to indicate and register the volume of the gaseous products passed through said absorbing liquid.

4. In a gas analyzing device, the combination with liquid-containing chambers arranged in pairs, means to convey gases into said chambers, means to control the supply of gas to said chambers, and additional means to form a vacuum in the chambers; of a tank adapted to retain an absorbing liquid, means to convey the gaseous products from portions of said chambers through the absorbing liquid and below the surface thereof, an absorbing chamber above the tank and means connected to one of the chambers to designate the amount of gaseous product passed through the absorbing chamber.

5. A gas analyzing device, comprising a pair of chambers, a tube connecting said chambers and extending above the same, a supply pipe connected to one end of said tube, a pipe connected to the opposite end of the tube, controlling cocks at the ends of said tube, a vacuum pump attached to the last-mentioned pipe, a pair of flexibly connected chambers, a tank between the first-mentioned chambers and the last mentioned chambers, said tank containing an absorbing liquid, an absorption chamber above said tank, a tube extending through said tank and into said absorbing chamber, means to convey the gaseous products from the first-mentioned chambers into said tube and below the surface of the absorbing liquid and means connected to one of the flexibly connected chambers for registering the gases contained in said last-mentioned chambers.

In testimony whereof I have signed my name to this specification in the presence of two subscribing witnesses.

GUNNAR VICTOR CEDERBORG.

Witnesses:
ALBERT DAHLBERG,
H. V. FRANOW.